Patented Dec. 10, 1929

1,739,446

UNITED STATES PATENT OFFICE

ANDRÉ HENRI VICTOR DURR, OF PARIS, FRANCE, ASSIGNOR TO COMPAGNIE NATIONALE DE MATIERES COLORANTES ET MANUFACTURES DE PRODUITS CHIMIQUES DU NORD REUNIES, ETABLISSEMENTS KUHLMANN, OF PARIS, FRANCE, A CORPORATION OF FRANCE

RESINOUS CONDENSATION PRODUCT AND PROCESS OF PREPARING SAME

No Drawing. Application filed January 2, 1929, Serial No. 329,939, and in France December 31, 1927.

The present invention relates to esters and new derivatives and their resinous condensation products obtained by the combination of an aliphatic polyhydric alcohol with a mixture of a polybasic aromatic acid anhydride and one or more natural resins (by the action of their resinic acids) and polymerization of the products formed.

It will be understood that, for the purpose of the present invention, the terms "polybasic acids" and "natural resins" are of a general character, and include polybasic anhydrides in the one case, and natural gums in the other.

It is well-known that when glycerine is heated with phthalic anhydride in sufficient quantity to fully replace the free hydroxyl groups of the glycerine esters and then products of condensation more or less polymerized are produced.

In the same way natural resins may be combined with glycerine to give, by the action of their resinic acids, products known under the name of resinic esters.

According to the present invention new esters and derivatives are obtained, as well as their condensation products, by esterifying the alcohol radicals of a polyhydric alcohol, glycerine for example, by means of a mixture of an aromatic acid or polybasic anhydride, phthalic anhydride for example, and one or more natural resins or gums, such as colophony, manilla gum, dammar gum, etc., and condensing the esters obtained until resinous products are obtained.

In the preferred form of my invention, I replace only a part of the free hydroxyl content of the glycerine by the phthalic anhydride, another part by the natural resin (through its resinic acid), and leave some free hydroxyl groups remaining. Of course, the number of free hydroxyl groups replaced by the phthalic anhydride and the natural resins, and the number of free groups remaining, may be varied according to the basic ester required.

It will be noted that, in the process, a small quantity of the excess of glycerine used distils over with the water liberated in the reaction.

The method of preparation of these new products is as follows—

The mixture of polybasic aromatic acid and resins is added to heated glycerine and the temperature is raised progressively.

At about 200° an abundant liberation of gaseous products is observed, indicating a reaction, and the rest of the operation is more or less continued as regards length of time and temperature according to the products desired.

The addition of the acid or anhydride and of the resin may be effected molecule by molecule (the molecular weight of the resin being calculated according to its acid value) or in any other proportion on account of the subsequent reaction of condensation.

At the end of the condensation the mass is run off in slabs and pulverized. The new resinous products are in the form of white to brown powder according to the nature of their constituents.

The new resinous products differ distinctly from the well-known synthetic resins; they cannot be considered as mixtures of these resins and resinic esters for the following reasons:

1. The new products may be heated above 250° C., for several hours without polymerizing and without change of solubility, while the known synthetic resins of the glyceryl phthalate type polymerize under similar conditions in the form of a spongy mass.

2. The new resinous products are easily dissolved in esters, such as ethyl acetate, butyl acetate, amyl acetate, benzyl acetate, ethyl phthalate, butyl phthalate, amyl phthalate etc.

3. In mixed solvents the new products also have a very high solubility, clearly better than that of most of the known synthetic resins.

The great solubility of these new resinous products in the principal solvents, diluents, and plastifying agents gives them a new technical quality and a special aptitude for entering into the preparation of varnishes, either alone or mixed with nitro-cellulose, acetyl-cellulose, resins or any other products.

The films of varnish obtained with the new resinous products are characterized by a remarkable adherence to the surfaces that they cover.

In the same way by starting from these new products compound varnishes; miscible in all proportions with the principal known nitro-cellulosic and aceto-cellulosic varnishes, may be prepared.

The new resinous products may also be used alone or mixed with nitro-cellulose, aceto-cellulose synthetic resins or the usual fillers for making moulded objects.

The following are different processes for obtaining these new resins.

Example I

At 110°, 285 parts of phthalic anhydride and 200 parts of colophony (acid value = 162,5) are added to 240 parts of glycerine.

The temperature is raised to 260 in 15-20 hours and the running off is effected after having maintained the temperature at 260° for 2 hours.

The resin obtained has a Ubbelohde dropping point at about 105°-120°.

Example II

At 110°, 285 parts of phthalic anhydride and 200 parts of colophony (acid value = 162,5) are added to 240 parts of glycerine and the temperature raised to 290° in 8 hours. After maintaining the temperature for 2 hours at 290° the product is run off.

The Ubbelohde dropping point of the product obtained is 130°-138°.

Example III

A mixture of 270 parts of phthalic anhydride and 400 parts of colophony (acid value = 162,5) is added to 270 parts of glycerine heated to 110° and the temperature raised to 290° in 8 hours the fusion mass being then run off.

The Ubbelohde dropping point of the product obtained is 131°-138°.

Example IV

At 110° 285 parts of phthalic anhydride and 100 parts of colophony (acid value = 162,5) are added to 220 parts of glycerine, the temperature raised to 260° in 8 hours and the mass run off at this temperature.

The Ubbelohde dropping point of the product obtained is 106°-112°.

Example V

A mixture of 285 parts of phthalic anhydride and 200 parts of dammar gum is added to 240 parts of glycerine at 110°, the temperature raised to 260° in 15 hours and maintained for 2 hours.

The product obtained when run off has an Ubbelohde dropping point of 137°-146°.

Example VI

A mixtures of 200 parts of phthalic anhydride and 200 parts of manilla gum is introduced into 150 parts of glycerine at a temperature of 110°. The temperature is raised to 170° in 5 hours and maintained at this temperature until the manilla gum is completely fused. The temperature is then raised progressively to 250° in 8 hours and the mass run off as soon as this temperature has been reached.

The Ubbelohde dropping point of the product obtained is 140°-157°.

From the foregoing proportions which show the glycerine to be in excess of the normal amount required for complete esterification of the acids, it is apparent that there will be remaining at least some free hydroxyl groups in the product. Correspondingly, these proportions are responsible for the low acid number of approximately 2-4 of the product.

These examples are not limiting with regard to the proportions of the materials entering into reaction, the duration and conditions of the heating (the different operations may be carried out in an autoclave), the nature of the alcohol used (glycerine may be replaced by other polyhydric alcohols, such as glycol, glucose, etc), the nature of the natural gums or resins used (colophony may be replaced by another resin or a mixture: Congo gum, manilla gum, dammar gum etc.) the nature of the aromatic polybasic acid.

These different condensations may also be accomplished in the presence of catalysts.

The dropping points of the products obtained vary, also within fairly large limits with the proportion of the constituents, the duration of the heating the temperature reached, i. e. the degree of polymerization.

The following are compositions of a few varnishes based on the new resinous products.

The following description may serve to distinguish the new resinous products from ordinary glyceryl phthalate resins.

Glyceryl phthalate esters can be considered as polymers of glyceryl phthalate, all the free hydroxyls are then saturated by the phthalic anhydride generally used in excess so that these esters can be represented by the general formula:—

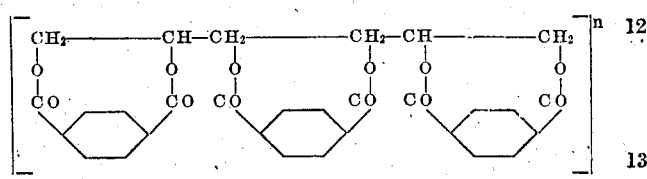

$n$ being the index of the degree of polymerization. The products obtained by heating the resin form the derivatives of this fundamental base.

In our process on the contrary we only saturate a part of the OH of the glycerine by the phthalic anhydride, another part by the resin employed by means of its resinic acids and leave some free OH, so that the base of polymerization is constituted by a schematic formula, R—COOH representing the resin, the value of R being characterized by the acid index:

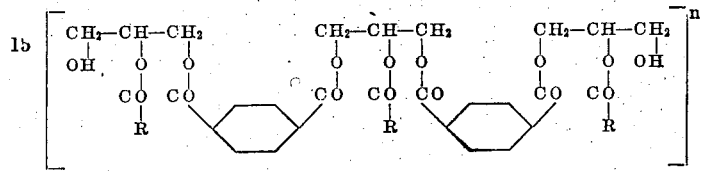

It is evident that in this formula the number of hydroxyls saturated by the anhydride and that saturated by the colophony is variable according to the respective proportions of resin and anhydride employed, and it is the same for the number of free OH. It should be noted, moreover, that a very small part of the glycerine in excess distils over with water.

We will calculate, by way of example, the Example II in the specification:

200 of colophony of acid value 162.5 corresponding to $$\frac{\text{Acid value of colophony} \times 1/3 \text{ mol. wt. of glycerine}}{\text{molecular weight of potassium hydroxide}} = \frac{\frac{162.5 \times 92}{3}}{56} = 89$$

of the glycerine index saturates a quantity of glycerine equal to $200 \times 0.089 = 17.8$ grs. of glycerine. By "acid value" or "acid number" is meant the number of milligrams of KOH required to neutralize 1 gram of the acid in the resin.

The phthalic anhydride would correspond to $$\frac{2 \times \text{mol. wt. of glycerine} \times 285 \text{ parts of phthalic anhydride}}{3 \times \text{mol. wt. of phthalic anhydride}} = \frac{184 \times 285}{444} = 118 \text{ grs. of glycerine.}$$

$118 + 17.8 = 135.8$ grs. There is then in the process a certain quantity of glycerine in excess.

The difference between the chemical constitution is characterized by the properties, solubility and others, as stated in the text, the action of heat being particularly interesting.

The new product differentiates from the products of the glyceryl phthalate type in that these latter derivatives when maintained for several hours at 250° C., polymerize in a spongy form, whilst our products can be maintained for 100 hours at 250° C. without polymerization, and without alternation of solubility.

The apparatus of Ubbelohde is usually employed for the determination of the fusibility of resins, and is described in the work of Hans Wolff (Berlin) translated by Jouve and published in Paris by Charles Beranger in 1926 under the name of Manuel de Laboratoire Pour L'Industrie des Vernis et Couleurs. Reference is made to pages 7 and 8; it consists of a thermometer to which can be attached a small cup, perforated at its base. The bulb of the thermometer is thus immersed in the resin. The whole is heated in an air bath and the temperature at which the meniscus of the resin begins to appear, and the temperature at which the drop falls are noted, so that the Ubbelohde dropping point is characterized by two temperatures.

So far as is known, in the prior art, the glyceryl phthalate is combined with resinic acids, not natural resins themselves, and in such proportion that there are no free hydroxyl groups remaining in the product, contrary to the present process.

All temperatures are to be read as degrees centigrade.

I claim:—

1. The method of preparing a resinous condensation product, suitable to form a varnish film, which method consists in heating an aliphatic polyhydric alcohol with a polybasic acidic substance and at least one natural resin, the amount of natural resin being less than the sum of the amounts of the polybasic acidic substance and the aliphatic polyhydric alcohol so as to cause combination of the polybasic acid, and the resinic acid of the natural resin, with the polyhydric alcohol, while leaving an excess of uncombined hydroxyl groups of the alcohol in the product, and continuing the heating until a resinous condensation product is obtained which is markedly soluble in usual solvents, and which may be maintained for hours at a temperature of 250° C. without apparent polymerization or change of solubility, this product having an acid number of approximately 2 to 4.

2. As a new product, a resinous condensation product suitable to form a varnish film, obtained by reacting upon an aliphatic polyhydric alcohol with a polybasic acidic substance and at least one natural resin, the amount of natural resin being less than the sum of the amounts of the polybasic acidic substance and the aliphatic polyhydric alcohol so as to cause combination of the polybasic acid and the resinic acid of the natural resin, with the polyhydric alcohol, while leaving an excess of uncombined hydroxyl groups of the alcohol in the product, the said product being easily dissolved in esters, being highly soluble in mixed solvents, and being capable of being heated above 250° C. for several hours without apparent polymerization or decrease of solubility, this product having an acid number of approximately 2 to 4.

3. As a new product, a resinous condensation product obtained by acting upon an aliphatic polyhydric alcohol with a mixture of phthalic anhydride and at least one natural resin, the amount of natural resin being less than the sum of the amounts of phthalic anhydride and glycerine so as to form a product containing free hydroxyl groups, this product having an acid number of approximately 2 to 4.

4. As a new product, a resinous condensation product obtained by acting on glycerine with a mixture of phthalic anhydride and a naturel resin the amount of natural resin being less than the sum of the amounts of phthalic anhydride and glycerine so as to replace a part of the free hydroxyl groups in the glycerine by the phthalic anhydride and a part by the resinic acid of the resin and leave some free hydroxyl groups remaining.

5. As a new product, a resinous condensation product obtained by acting upon a quantity of glycerine with a mixture of a polybasic acidic substance and at least one natural resin the amount of natural resin being less than the sum of the amounts of glycerine and polybasic acidic substance so as to cause combination of the polybasic acid and resinic acid of the natural resin with the glycerine, while leaving an excess of uncombined hydroxyl groups of the alcohol in the product, this product having an acid number of approximately 2 to 4.

6. The method of preparing a resinous condensation product, suitable to form a varnish film which method consists in heating an aliphatic polyhydric alcohol with a mixture of a polybasic acidic substance and at least one natural resin the amount of natural resin being less than the sum of the amounts of aliphatic polyhydric alcohol and polybasic acidic substance so as to form by continued heating at about 200° C. a resinous condensation product containing at least some free hydroxyl groups, this product having an acid number of approximately 2 to 4.

7. A method as in claim 6, wherein the aliphatic polyhydric alcohol employed is glycerine.

8. A method as in claim 6, wherein the polybasic acidic substance employed is phthalic anhydride.

In testimony whereof I have hereunto affixed my signature.

ANDRÉ HENRI VICTOR DURR.